US010579729B2

(12) United States Patent
Gliozzo et al.

(10) Patent No.: US 10,579,729 B2
(45) Date of Patent: Mar. 3, 2020

(54) METHODS AND SYSTEM FOR FAST, ADAPTIVE CORRECTION OF MISSPELLS

(71) Applicant: International Business Machines Corporation, Armonk, NY (US)

(72) Inventors: Alfio M. Gliozzo, Brooklyn, NY (US); Piero Molino, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 15/296,818

(22) Filed: Oct. 18, 2016

(65) Prior Publication Data

US 2018/0107643 A1 Apr. 19, 2018

(51) Int. Cl.
*G06F 16/332* (2019.01)
*G06F 17/27* (2006.01)

(52) U.S. Cl.
CPC ........ *G06F 17/273* (2013.01); *G06F 16/3322* (2019.01)

(58) Field of Classification Search
CPC .......................... G06F 16/3322; G06F 17/3064
USPC .................................................. 707/723, 767
See application file for complete search history.

(56) References Cited

U.S. PATENT DOCUMENTS

| 4,674,065 A | 6/1987 | Lange et al. |
| 5,148,367 A | 9/1992 | Saito et al. |
| 5,258,909 A | 11/1993 | Damerau et al. |
| 5,572,423 A | 11/1996 | Church |
| 5,604,897 A | 2/1997 | Travis |
| 5,659,771 A | 8/1997 | Golding |
| 5,699,441 A | 12/1997 | Sagawa |
| 5,907,839 A | 5/1999 | Roth |
| 6,047,300 A | 4/2000 | Walfish et al. |

(Continued)

FOREIGN PATENT DOCUMENTS

| EP | 1104568 B1 | 1/2012 |
| WO | WO-2009040790 A2 | 4/2009 |
| WO | WO-2012151255 A1 | 11/2012 |

OTHER PUBLICATIONS

Tyler Garaas, Mei Xiao, Marc Pomplun: Personalized Spell Checking using Neural Networks Tyler Garaas. University of Boston: 1-5.

(Continued)

*Primary Examiner* — Dung K Chau
(74) *Attorney, Agent, or Firm* — Pepper Hamilton LLP

(57) ABSTRACT

Embodiments are directed to a spellcheck module for an enterprise search engine. The spellcheck module includes a candidate suggestion generation module that generates a number of candidate words that may be the correction of the misspelled word. The candidate suggestion generation module implements an algorithm for indexing, searching, and storing terms from an index with a constrained edit distance, using words in a collection of documents. The spellcheck module further includes a candidate suggestion ranking module. In one embodiment, a non-contextual approach using a linear combination of distance and probability scores is utilized; while in another embodiment, a context sensitive approach accounting for real-word misspells and adopting deep learning models is utilized. In use, a query is provided to the spellcheck module to generate results in the form of a ranked list of generated candidate entries that may be an entry a user accidentally misspelled.

14 Claims, 17 Drawing Sheets

(56) References Cited

U.S. PATENT DOCUMENTS

| | | |
|---|---|---|
| 6,616,704 B1 | 9/2003 | Birman et al. |
| 7,047,493 B1 | 5/2006 | Brill et al. |
| 7,254,774 B2 | 8/2007 | Cucerzan et al. |
| 7,321,892 B2 | 1/2008 | Vadon et al. |
| 7,660,806 B2 | 2/2010 | Brill et al. |
| 7,809,744 B2 | 10/2010 | Nevidomski et al. |
| 7,818,332 B2 | 10/2010 | Olds et al. |
| 8,290,968 B2 | 10/2012 | Jonas |
| 8,441,454 B2 * | 5/2013 | Longe .................. G06F 3/0237 345/172 |
| 8,621,344 B1 | 12/2013 | Shazeer |
| 8,775,341 B1 | 7/2014 | Commons |
| 8,799,237 B2 | 8/2014 | Walsh |
| 9,015,036 B2 * | 4/2015 | Karov Zangvil ..... G06F 3/0237 704/9 |
| 9,020,822 B2 | 4/2015 | Kalinli-Akbacak |
| 9,031,293 B2 | 5/2015 | Kalinli-Akbacak |
| 9,037,967 B1 * | 5/2015 | Al-Jefri ................ G06F 17/273 715/257 |
| 9,245,052 B2 | 1/2016 | Brewer et al. |
| 9,557,916 B2 * | 1/2017 | Robinson .............. G06F 3/0236 |
| 9,740,767 B2 * | 8/2017 | Quinion ............ G06F 17/30864 |
| 2002/0087604 A1 | 7/2002 | Bernth et al. |
| 2003/0145285 A1 | 7/2003 | Miyahira et al. |
| 2007/0016616 A1 | 1/2007 | Brill et al. |
| 2008/0077396 A1 | 3/2008 | Hsu |
| 2008/0155398 A1 | 6/2008 | Bodin et al. |
| 2008/0167858 A1 | 7/2008 | Christie et al. |
| 2009/0089666 A1 | 4/2009 | White et al. |
| 2010/0076972 A1 | 3/2010 | Baron |
| 2011/0193797 A1 * | 8/2011 | Unruh .................. G06F 3/0237 345/173 |
| 2012/0191357 A1 | 7/2012 | Qiu |
| 2012/0229388 A1 | 9/2012 | Oh et al. |
| 2013/0066896 A1 * | 3/2013 | Mehanna .......... G06F 17/30401 707/767 |
| 2013/0238584 A1 | 9/2013 | Hendry |
| 2013/0262096 A1 | 10/2013 | Wilhelms-Tricarico |
| 2013/0283156 A1 | 10/2013 | Badrashiny et al. |
| 2014/0104175 A1 * | 4/2014 | Ouyang ............. G06F 17/2735 345/168 |
| 2014/0249799 A1 | 9/2014 | Yih |
| 2014/0358831 A1 | 12/2014 | Adams |
| 2015/0332670 A1 | 11/2015 | Akbacak et al. |
| 2016/0110343 A1 | 4/2016 | Kumar |
| 2016/0210551 A1 | 7/2016 | Lee |
| 2016/0306876 A1 | 10/2016 | Nichols |
| 2016/0350653 A1 | 12/2016 | Socher et al. |
| 2017/0032243 A1 | 2/2017 | Corrado |
| 2017/0358293 A1 | 12/2017 | Chua |
| 2017/0372200 A1 | 12/2017 | Chen et al. |
| 2018/0061439 A1 | 3/2018 | Diamos |
| 2018/0150605 A1 | 5/2018 | Co |

OTHER PUBLICATIONS

Eric Brill, Robert C. Moore: An Improved Error Model for Noisy Channel Spelling Correction. ACL 2000.

Silviu Cucerzan, Eric Bill: Spelling Correction as an Itrative Process that Exploits the Collective Knowledge of Web Users. EMNLP 2004: 293-300.

Aminul Islam, Diana Inkpen: Real-word spelling correction using Google web 1Tn-gram data set. CIKM 2009: 1689-1692.

Andrew R. Golding: In Proceedings of the Third Workshop on Very Large Corpora (1995): 39-53.

Andres R. Golding, Yves Schabes: Combining Trigram-based and Feature-based Methods for Context-Sensitive Spelling Correction. ACL 1996: 71-78.

Andrew R. Golding, Dan Roth: A Winnow-Based Approach to Context-Sensitive Spelling Correction. Machine Learning 34(1-3): 107-130 (1999).

Mark D. Kernighan, Kenneth Ward Church, William A. Gale: A Spelling Correction Program Based on a Noisy Channel Model. COLING 1990: 205-210.

Karen Kukich: Techniques for Automatically Correcting Words in Text. ACM Comput. Surv. 24(4): 377-439 (1992).

Lidia Mangu. Eric Brill. Automatic Rule Acqusition for Spelling Correction ICML 1997: 187-194.

Herman Stehouwer, Menno van Zaanen: Language models for contextual error detection and correction. CLAGI 2009: 41-48.

Kristina Toutanova, Robert C. Moore: Pronunciation Modeling for Improved Spelling Correction. ACL 2002: 144-151.

Casey Whitelaw, Ben Hutchinson, Grace Chung, Ged Ellis: Using the Web for Language Independent Spellchecking and Autocorrection. EMNLP 2009: 890-899.

"SpellChecker" Lucene Java-Wiki. Sep. 20, 2009. Web. Oct. 13, 2016. <http://wiki.apache.org/lucene-java/SpellChecker>.

Eric Mays, Fred J. Damerau, Robert L. Mercer: Context based spelling correction. Inf. Process. Manage. 27(5): 517-522 (1991).

Peiling Wang, Michael W. Berry, Yiheng Yang: Mining longitudinal web queries: Trends and patterns. JASIST 54(8): 743-758 (2003).

Non-Final Office Action dated Oct. 12, 2018 in corresponding U.S. Appl. No. 15/296,794.

Office Action dated Aug. 2, 2017 in related U.S. Appl. No. 15/296,794.

U.S. Appl. No. 15/296,794, filed Oct. 18, 2016.

Notice of Allowance dated Mar. 25, 2019 in corresponding U.S. Appl. No. 15/296,794.

\* cited by examiner

500

Search words at distance ≤ 1 and frequency > 0 from "the"

| the | 20 | 0 | generated | freq | disp frequency > 0 and distance ≤ 1?

keep

FIG. 5A

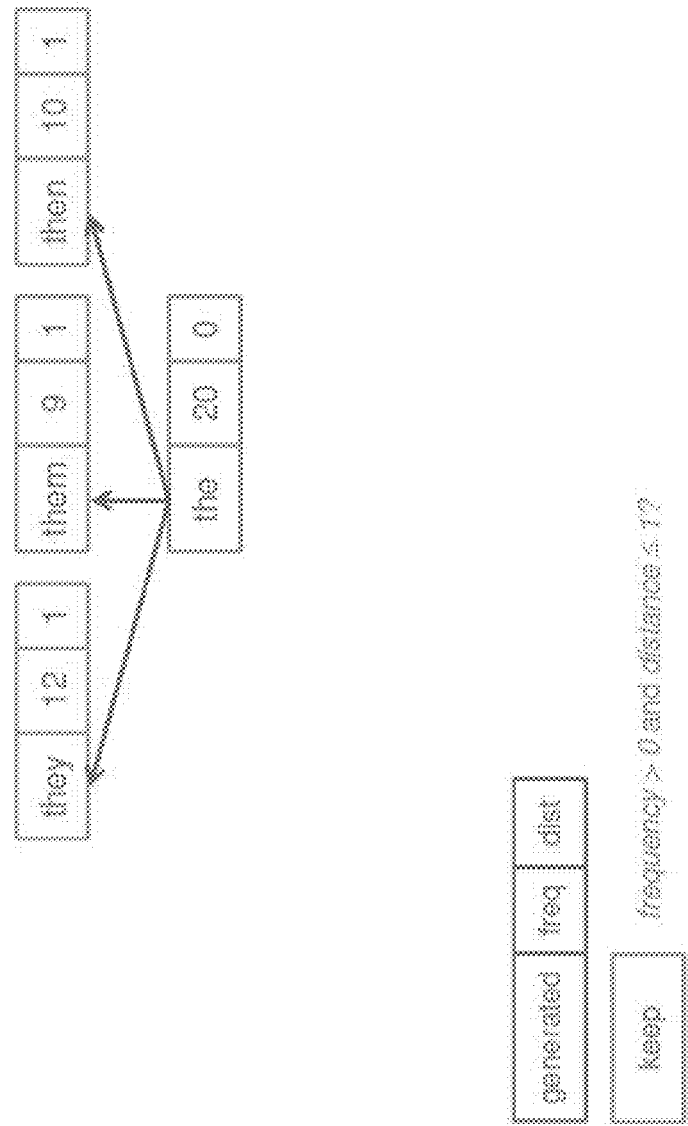

METHODS AND SYSTEM FOR FAST, ADAPTIVE CORRECTION OF MISSPELLS

BACKGROUND

Query spellchecking is a commonly-available feature in modern Internet search engines. However, enterprise search engines often lack this functionality as implementing spellcheck without web query logs may require a language dependent and a vocabulary dependent solution that is difficult to implement. Off-the-shelf, open source spellcheckers are insufficient as such software, while able to identify errors in grammatically-correct texts such as those used in a word processors, fails in adapting to a specific domain such as a particular enterprise.

Thus, there is a need for an enterprise search engine query spell correction that is adaptable and customizable to customer-specific data.

SUMMARY

Embodiments are directed to a spellcheck module for an enterprise search engine.

According to embodiments, a computer-implemented method, system, and computer program product are provided for adaptive correction of misspelling. The system includes a processor coupled to one or more user devices, the processor configured to receive user-generated search queries from the one or more user devices. The computer program product comprises a computer readable storage medium having program instructions embodied therewith, the program instructions executable by a processor. The processor is configured to implement the computer-implemented method of defining a maximum edit distance and a threshold frequency for words of a dataset to be added to an index; sorting the dataset to identify the words of the dataset to add to the index based on the threshold frequency; adding to the index the identified words and alternative words having character deletions in accordance with the maximum edit distance to create entries; receiving a text for spelling analysis; identifying one or more candidate entries from the entries of the index by obtaining from the index the entries associated with the text; and ranking the one or more candidate entries utilizing a non-contextual scoring approach.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 5A-5D are example searching operations, according to embodiments;

DETAILED DESCRIPTION

Figure 1:
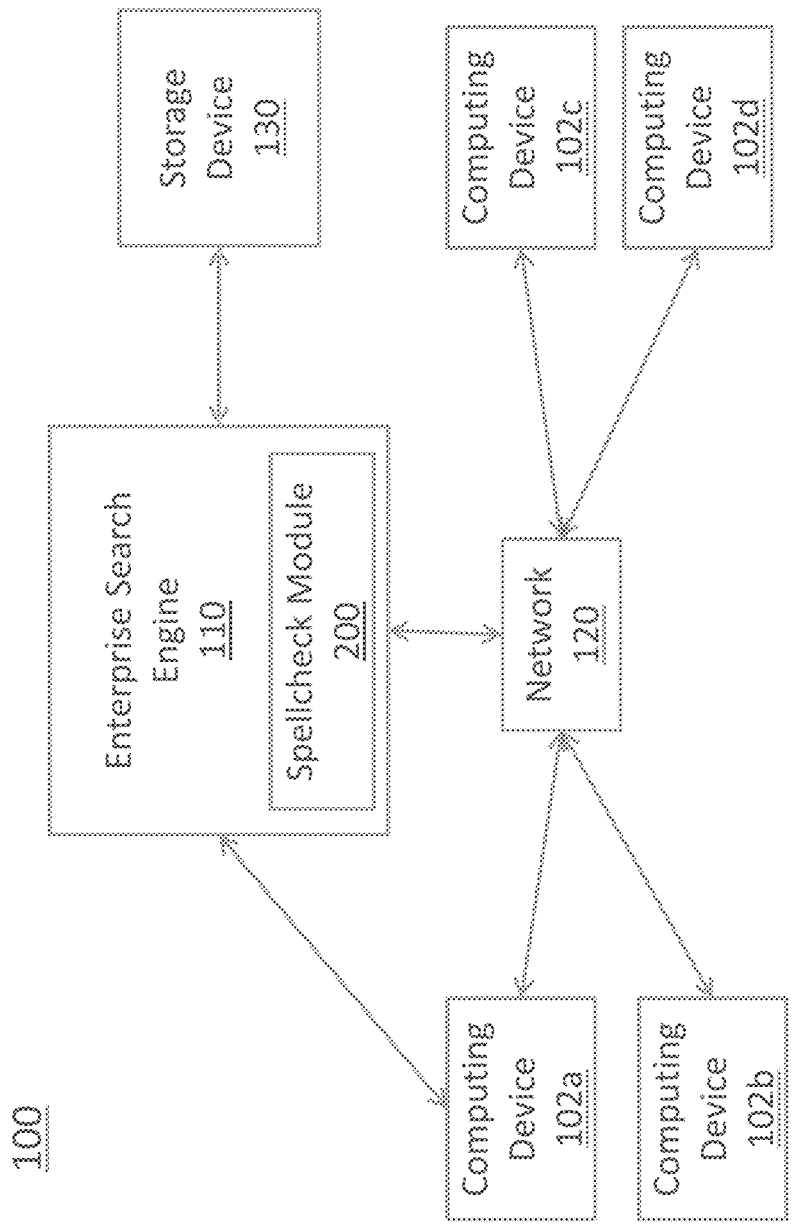
FIG. 1 is a diagram depicting a system in which an enterprise search engine and a spellcheck module may be implemented, according to embodiments herein.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

According to embodiments disclosed herein, a spellcheck module for an enterprise search engine is provided. Several constraints related to an enterprise search engine are addressed, according to embodiments provided herein, including: unavailability of query logs, language independence, operability for non-syntactical sentences (i.e., the solution cannot rely on classical linguistic features), availability of only raw text data (i.e., document collection indexed by the search engine), and speed. According to embodiments, the spellcheck module employs a self-adaptable misspell detection strategy on customer data. The spellcheck module is an advantageous feature for an enterprise search engine as, according to some research, 26% of search engine queries contain misspells, 25-40% of which are real words (e.g., "them" misspelled as "then") and the remaining of which are out of vocabulary words. Misspell detection improves search results and strongly improves user experience.

According to an embodiment disclosed herein, a candidate generation algorithm is provided for generating a candidate set of entries for an entry in a text that is part of a user query. According to additional embodiments, candidate suggestion ranking functions are provided for ranking the generated candidate set of entries. In an embodiment, a candidate suggestion ranking function utilizes a non-contextual approach, while in another embodiment, a candidate suggestion ranking function utilizes a context sensitive approach.

FIG. 1 is a diagram depicting a system 100 in which an enterprise search engine 110 and a spellcheck module 200 may be implemented, according to embodiments herein. The system 100 includes the enterprise search engine 110 coupled directly or via a network 120 to various computing devices 102a, 102b, 102c, and 102d. Each device 102a, 102b, 102c, and 102d may be a user computing device from which one or more queries are generated and transmitted to the enterprise search engine 110. Additional or fewer devices 102 may be included in the system 100. A storage device 130 coupled to the enterprise search engine 110 is also provided in the system 100. The storage device 130 receives and stores information related to, for example, the enterprise search engine 110 and the user devices 102a, 102b, 102c, and 102d.

According to an embodiment, the enterprise search engine 110 comprises one or more processors and/or modules for implementing search functionality to provide results to user-generated queries. One such module is the spellcheck module 200, further described in accordance with embodiments herein.

Figure 2:
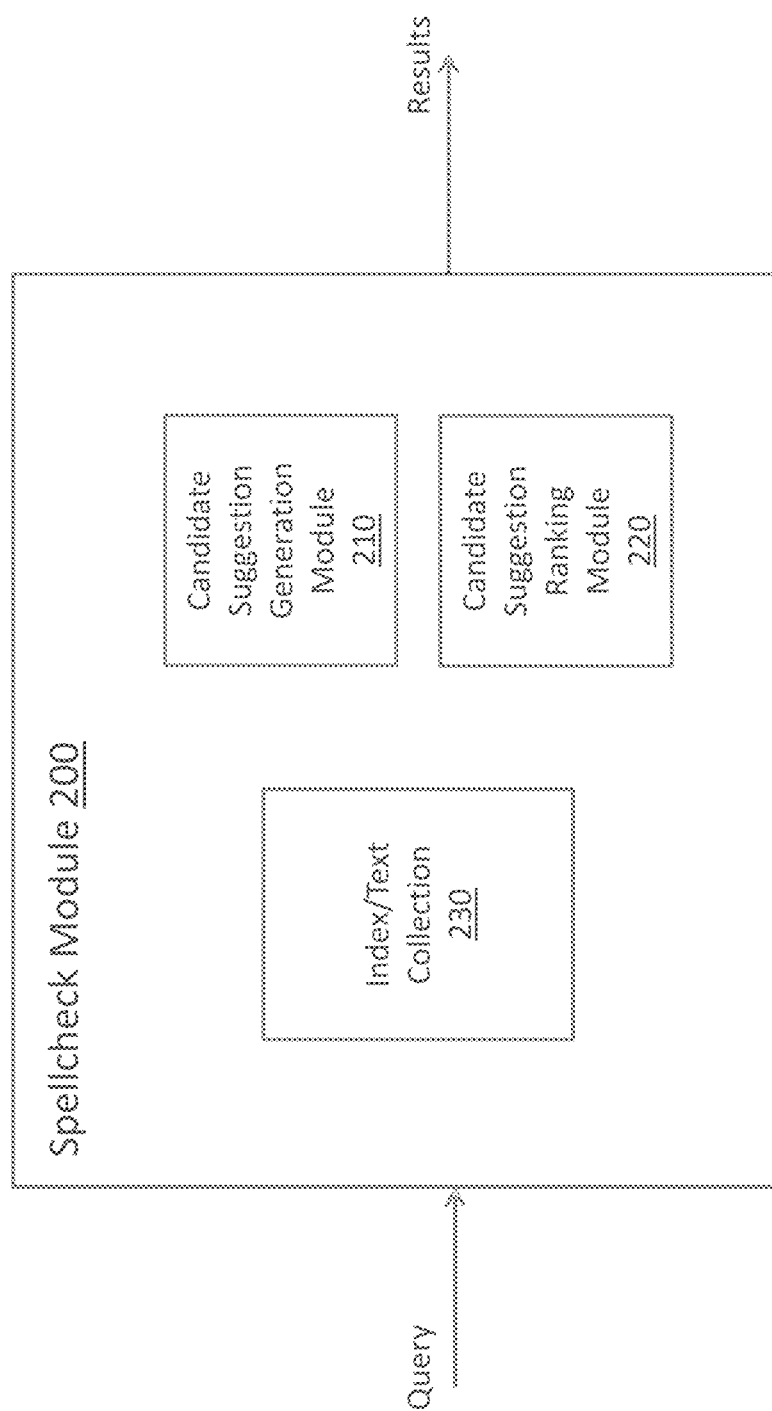
FIG. 2 is a block diagram illustrating components of a spellcheck module, according to embodiments herein.

FIG. 2 is a block diagram illustrating components of a spellcheck module 200 of the enterprise search engine 110, according to embodiments. As shown in FIG. 2, the spellcheck module 200 is comprised of an index/text collection 230, which may, in an embodiment, be part of the storage device 130. In an alternative embodiment, the index/text collection 230 is separate from the storage device 130. The spellcheck module 200 further includes a candidate suggestion generation module 210 and a candidate suggestion ranking module 220. In an embodiment, a query is provided to the spellcheck module 200, which utilizes the modules 210 and 220 as well as the index/text collection 230, each further described herein, to generate results in the form of, for example, a ranked list of generated candidate entries. The ranked list comprises candidates that may be an entry a user accidentally misspelled.

The candidate suggestion generation module 210 generates a number of candidate words that may be the correction of the misspelled word. The candidate suggestion generation module 210 implements an algorithm for indexing, searching, and storing terms from an index (i.e., 230) with a constrained edit distance. According to an embodiment, words in the collection of documents of the enterprise search engine 110 (i.e., the index/text collection 230) that are within a distance of two are searched. The distance of two is utilized based on the premise that 99.5% of all errors are within Damerau-Levenshtein edit distance of two from the misspelled word. In other embodiments, other edit distances may be utilized by the candidate suggestion generation module 210.

A maximum edit distance ("med") (e.g., two) and a threshold frequency ("tf") are defined prior to implementation of the spellcheck module 200. The threshold frequency is a frequency of a term that will be considered as a candidate word. A term that appears only one time in a dataset is most probably a misspell, while a term that appears tf times is more likely to be a meaningful word. In an embodiment, tf is dependent on the size of the dataset.

Figure 3:
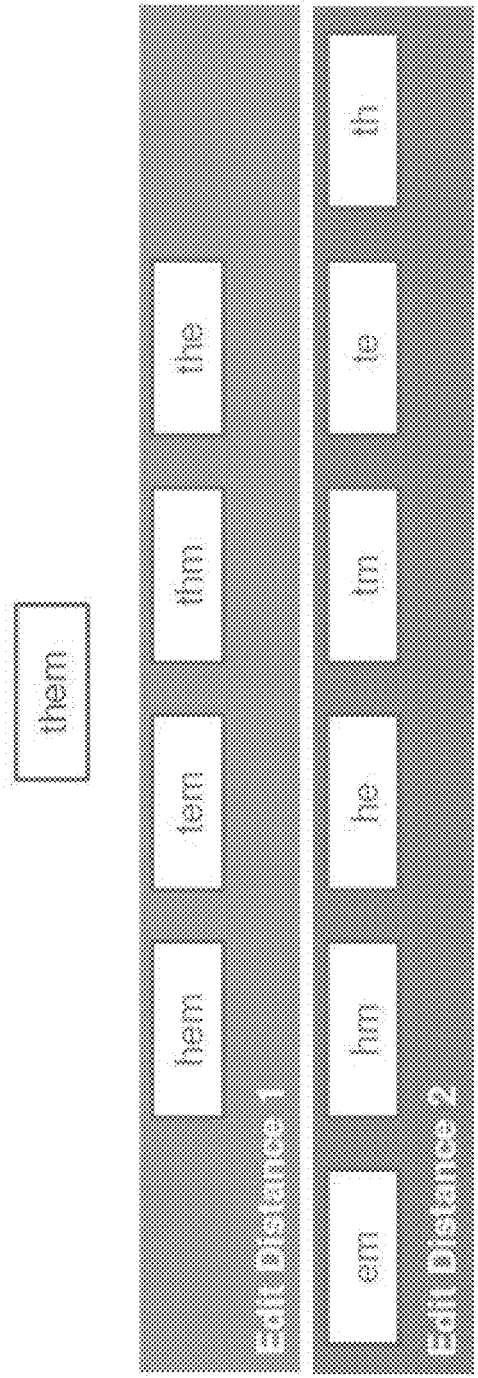
FIG. 3 is an example representation of the concept of edit distance, according to embodiments herein.

FIG. 3 is an example representation 300 of the concept of edit distance for the word "them," with an edit distance of one and an edit distance of two illustrated. As shown in FIG. 3, the entries in the "edit distance 1" have one character removed from the text "them," and the entries in the "edit distance 2" comprise entries with a second character removed. The delete of length one are the concatenations of the two substrings of a string obtained removing a character from the string. The deletes of length n are the set of deletes of the deletes of length (n−1) of a string. As another example, for the word "home" and for a med=1, the deletes are: "ome", "hme", "hoe", and "hom"; for med=2 they are: "me", "he", and "ho."

The indexing portion of the algorithm for the candidate suggestion generation module 210 comprises sorting through the dataset to collect words and their frequencies. As soon as a word reaches the "tf," added to the index are all of the deletes of length "med" of the word.

When adding the deletes, the word that originated them is also tracked so that each delete entry contains a frequency of "0" and a set of words that originated them. The frequency is needed because if an actual word in the dataset that is identical to a previously added delete (e.g., "me" as a word and as a delete of "home") is encountered, its deletes need to be added when it reaches the threshold "tf." At the same time, a word that was found in the dataset can become later the delete of a longer word, so a link to the longer word is added. Both real words and deletes have two values: frequency and set of links. For memory efficiency, it is sufficient to store a link (an integer if words are mapped to integers) for deletes that never appear in the dataset, and an object containing an integer for frequency and a set/list/array of links.

Figure 4A:
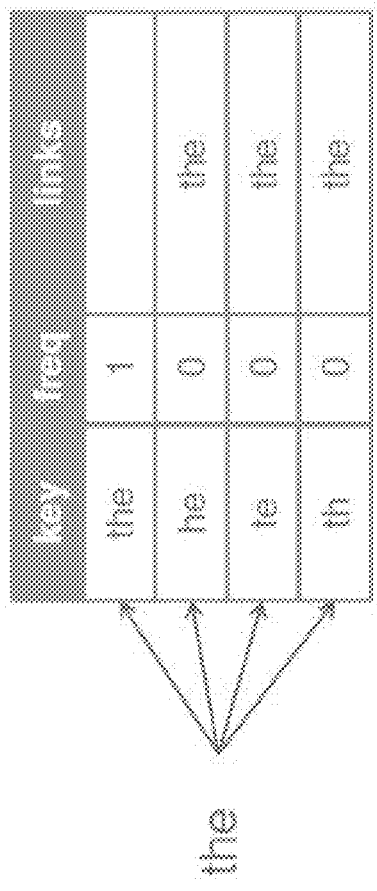
FIGS. 4A-4C are example indexing operations, according to embodiments.
Figure 4B:
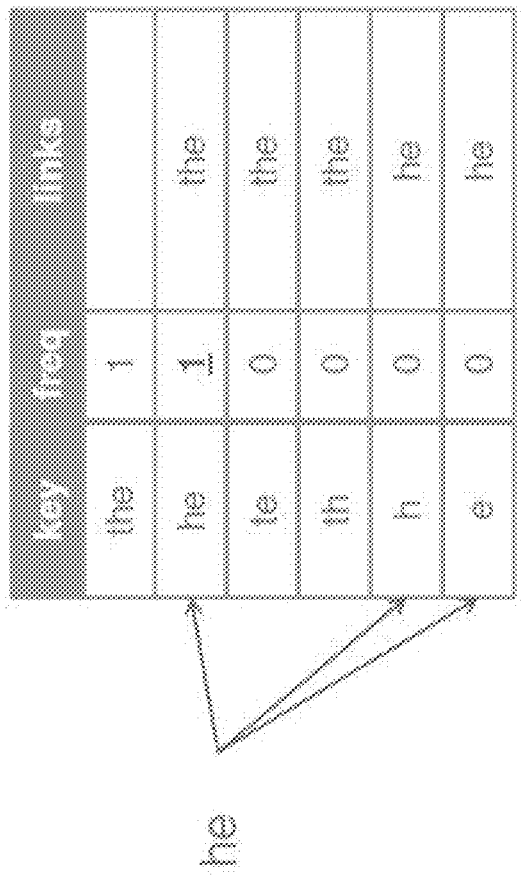
Figure 4C:
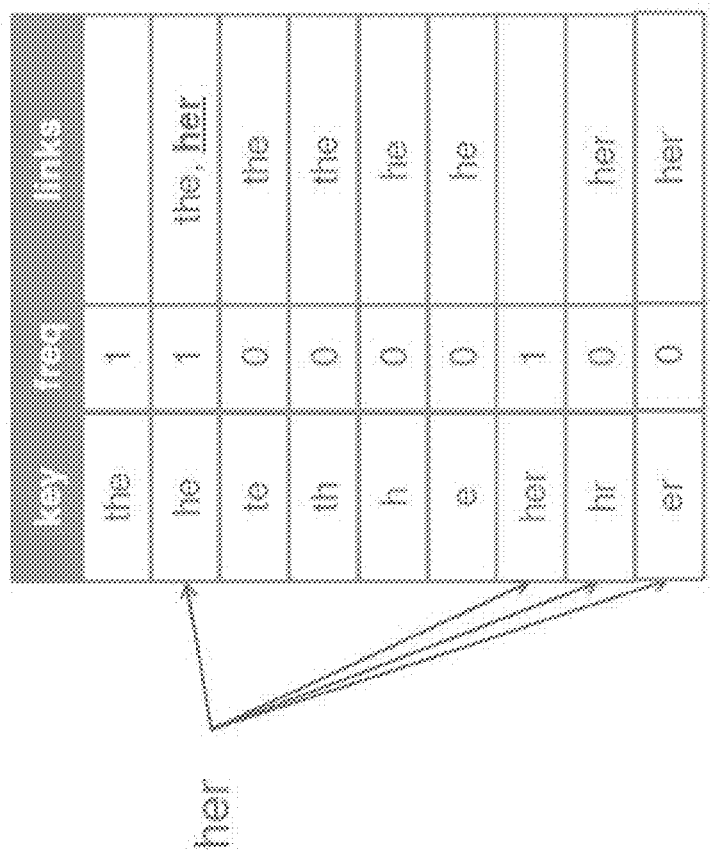

The indexing concept is illustrated in FIGS. 4A-4C, which show example indexing operations, according to an embodiment. Diagram 400 of FIG. 4A illustrates the operation of indexing the word "the" and the deletes of length "1;" diagram 410 of FIG. 4B illustrates the operation of indexing the word "he" and the deletes of length "1;" and diagram 420 of FIG. 4C illustrates the operation of indexing the word "her" and the deletes of length "1."

The searching portion of the algorithm for the candidate suggestion generation module 210 comprises the following operation: a list of candidates are maintained with the misspell and its deletes added to it; the searched word is added to the candidate list; for an element from the candidate list, if it is not already visited and it is more frequent than "tf," it is added to the suggestion list; for every element in its links that is not already visited, the distance with respect to the searched word is computed; if the distance is below the "med," the linked word is added to the suggestion list; if the length of the candidate and the length of the misspell is less than the "med," all of the deletes of the candidate are added to the candidates and the process is repeated.

Figure 5C:
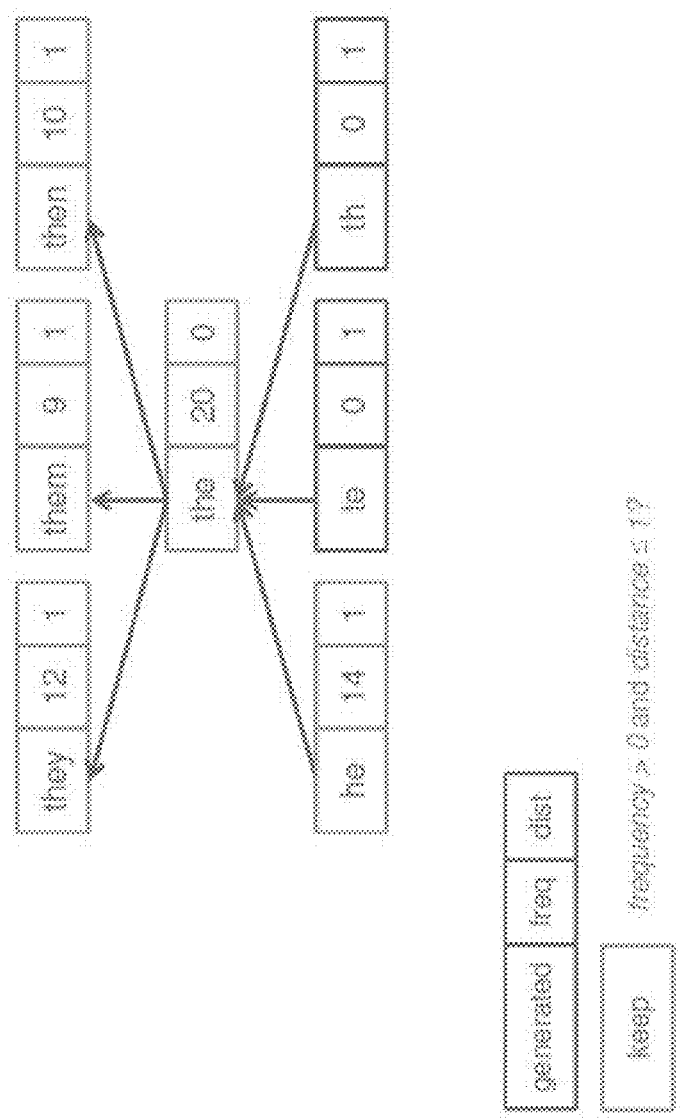
Figure 5D:
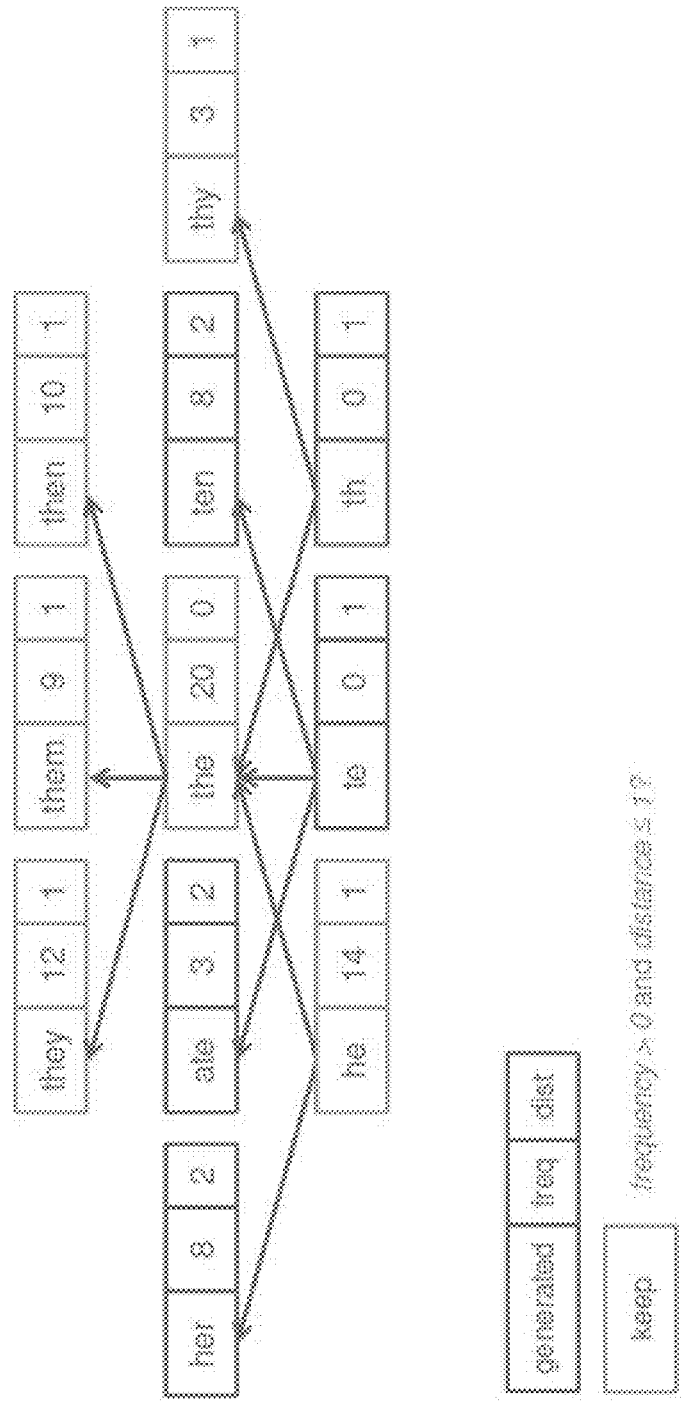

FIGS. 5A-5D are example searching operations, according to an embodiment. Diagram 500 of FIG. 5A illustrates an initial search query to search words at a distance less than or equal to one and with a frequency greater than zero from "the." The next search step is illustrated in diagram 510 of FIG. 5B, obtaining the words "the" links to. As shown in diagram 520 of FIG. 5C, the deletes of "the" are then obtained; and as shown in diagram 530 of FIG. 5D, the words linked by the deletes of "the" are obtained.

For the storage aspect of the candidate suggestion generation module 210, in addition to the words in the dataset, more items are stored in the index. The amount of additional items for each word depends on the length of the word and the "med." For a maximum edit distance of two, an average word length of 5, and 100,000 dictionary entries, 1,500,000 deletes also need to be stored.

The algorithm implemented by the candidate suggestion generation module 210, according to embodiments herein, trades memory for speed and recall: it is faster than the n-gram method (which has about 65% recall), but guarantees a 100% recall, while being 100 to 10,000 times faster than the fastest 100% recall method so far, at the cost of increased memory usage.

Now turning to the candidate suggestion ranking module 220, in an embodiment, a candidate suggestion ranking function that utilizes a non-contextual approach uses a linear combination of distance and probability scores, while in another embodiment, a candidate suggestion ranking function that utilizes a context sensitive approach accounts for real-word misspells and adopts deep learning models. In both approaches, only the documents in the collection are needed to build a model to be used for candidate ranking.

According to an embodiment in which a non-contextual approach is utilized, the candidate suggestion ranking module 120 implements a weighted linear combination of Damerau-Levenshtein distance and smoothed term probability. This linear combination, weighted by a parameter alpha, is consistently better than using probability or distance alone, based on experimentation. The absence of contextual features allows the system to be fully language independent and to be very fast, reaching 90% average accuracy.

According to an embodiment, a ranking score is a linear combination of Smoothed Term Probability (STP) and Edit Similarity (ES). The probability of a term considering the log of the frequency and the log of all occurrences is computed:

STP=log(freq(correction))/log(freq(all)).

The Edit Similarity is computed as:

ES=1−(Damerau-Levenshtein(misspell,correction))/
|misspell|.

This normalizes the distance and transforms it into a similarity.

The final score is computed as:

wscore=(alpha)STP(correction)+(1-alpha)ES(correction,misspell).

Alpha is a hyper parameter to be found, ideally on a validation set; in some embodiments, good results are obtained with alpha=0.65.

Figure 6:
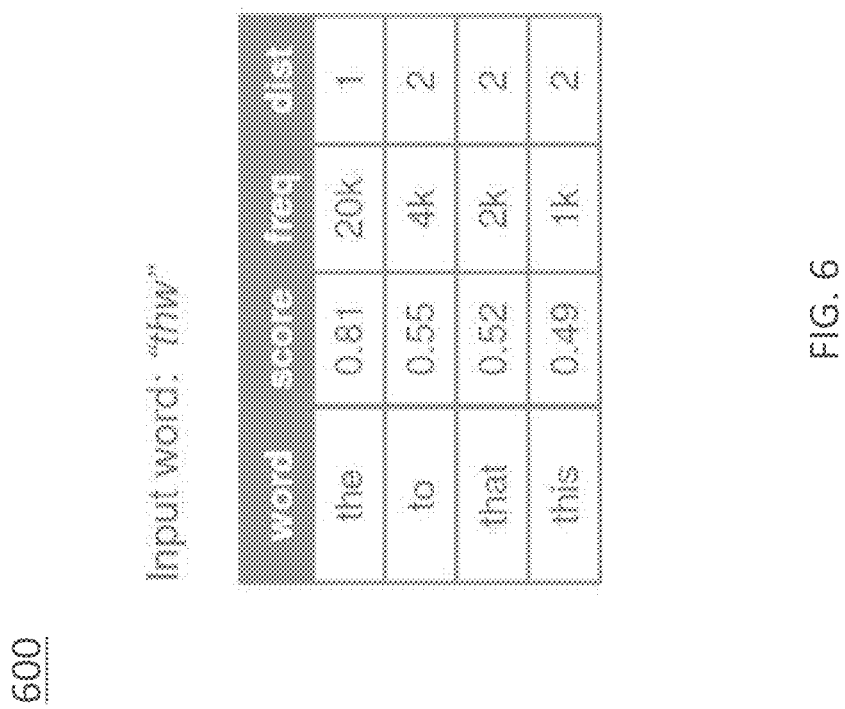
FIG. 6 illustrates non-contextual scoring aspects, according to an embodiment.

FIG. 6 provides a diagram 600 of results of scoring in which the candidate suggestion ranking module 220 utilizes the non-contextual scoring aspects described herein.

In an alternative embodiment in which a context sensitive approach is utilized, the candidate suggestion ranking module 120 implements a deep neural language model. Given a sentence of length "s," all possible candidate suggestions for spellchecking the word "$w_i$," are ranked. All the words in the sentence are mapped to pre-trained word vectors. The sequence of words $w_i, \ldots w_{i-1}$ are inputted to a Recurrent Neural Network; and its last output vector is used as a representation of the left context of the word "$w_i$".

The same is done for the right side: the sequence $w_s, \ldots w_{i+1}$ (reversed order) is inputted to obtain a vector representing the right context of the word $w_i$.

The left context vector, the word $w_i$ vector, and the right context vector are inputted to a fully connected layer connected to a logistic unit. The final output of the logistic unit is in [0, 1] and can be interpreted as the score of the word $w_i$ in the context it appears.

A forward pass in the network is run for each candidate correction, and the computed scores are collected. Those scores are finally used for ranking.

Figure 7:
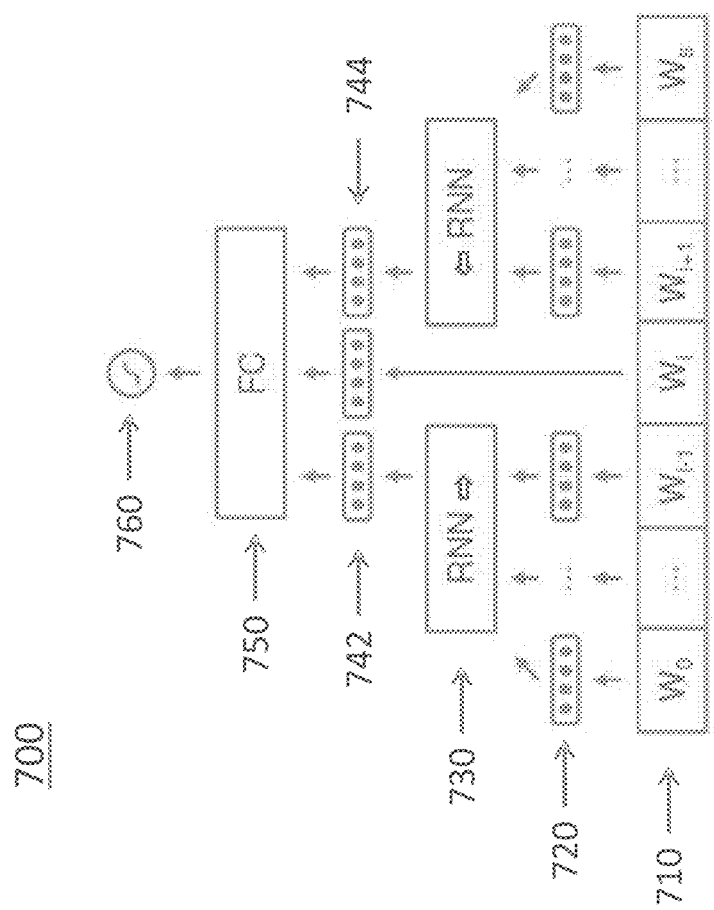
FIG. 7 illustrates context sensitive scoring aspects, according to an embodiment.

Diagram 700 of FIG. 7 illustrates context sensitive scoring aspects, according to the embodiment described herein. As shown, the words 710 are mapped to a pre-trained word vector 720. A Recurrent Neural Network (RNN) 730 is used to obtain a vector representing the left context (742) and another one for the right context of $w_i$ (744). A fully connected (FC) layer 750 is connected to a logistic unit that outputs a score in [0, 1]. Training with negative sampling is done, and $w_i$ is replaced with candidate corrections to output the score 760 to use for ranking.

According to embodiments, the deep learning approach allows for alternative instantiations of the model. According to an embodiment, pre-trained word vectors can be carried out with various methods, including but not limited to: cbow, skip-gram, GloVe, LSA, PLSA, LDA, HAL, NNMF, and any other embedding method. In experimentation, the skip-gram model performed best.

There are also different Recurrent Neural Network alternatives to choose from: simple RNN, LSTM, and GRU, for example. A simple alternative would be to also consider a specific window of k elements and simply concatenate the word vectors for those k elements to represent the context. In experimentation, LSTM was the best performing alternative.

The fully connected layer at the end can vary in size, deepness (there could be several stacked fully connected layers, for example), and activation function. In experimentation, one layer with hyperbolic tangent activation was the best performing alternative.

Figure 8:
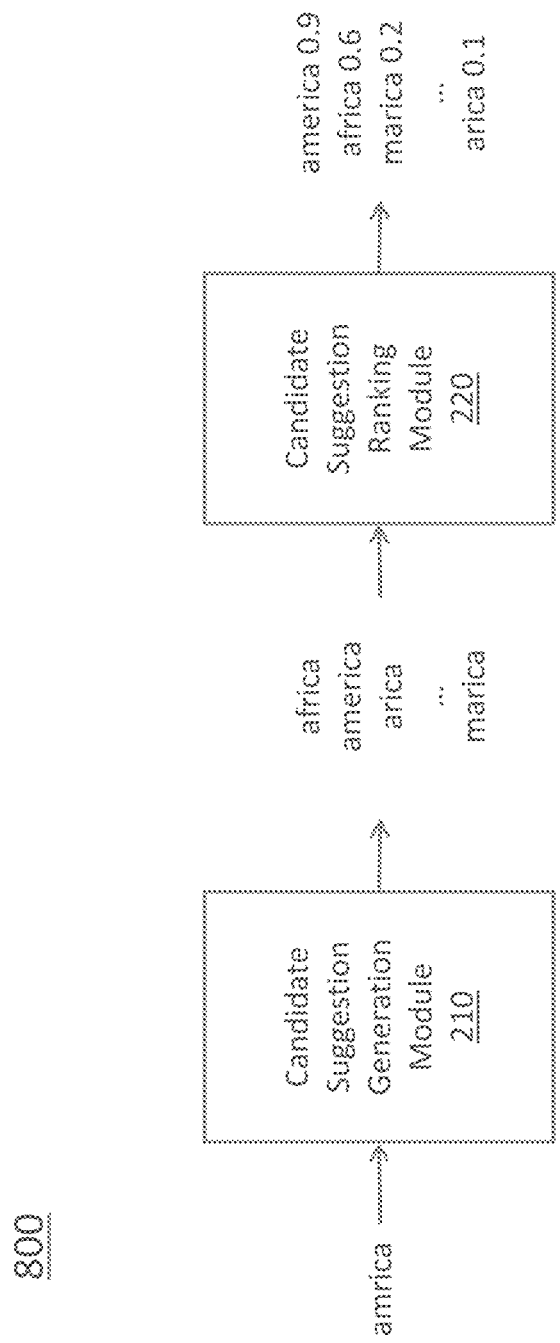
FIG. 8 is a runtime example of the implementation of a spellcheck module, according to embodiments herein.
Figure 9:
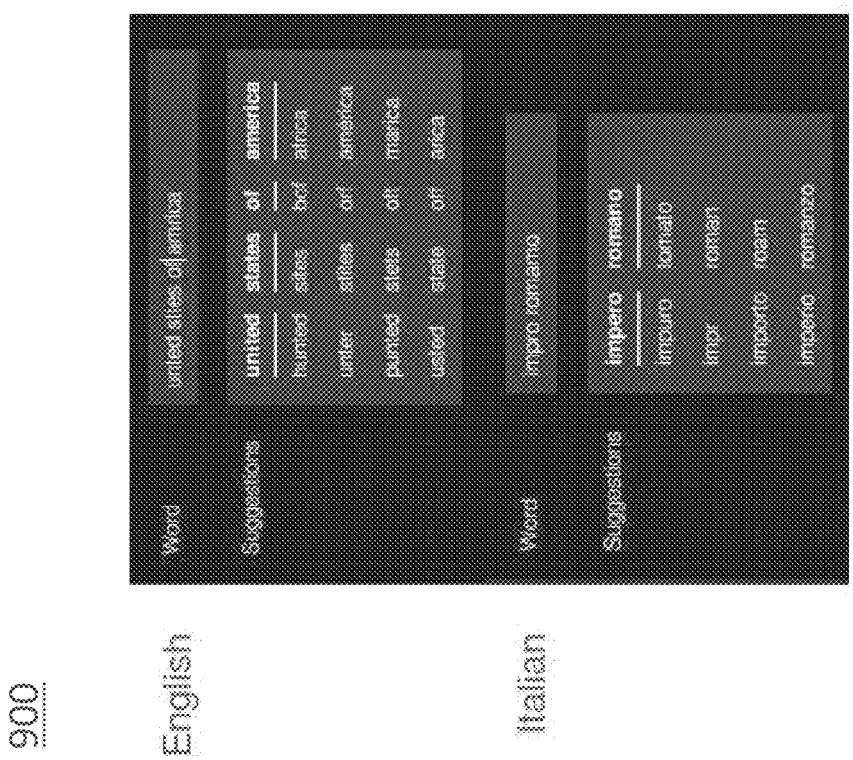
FIG. 9 is a screenshot output example of the implementation of a spellcheck module, according to embodiments herein.

FIG. 8 is a runtime example 800 of the implementation of a spellcheck module 200 utilizing the candidate suggestion generation module 210 and the candidate suggestion ranking module 220, according to embodiments herein; and FIG. 9 is a screenshot output example 900 of the implementation of the spellcheck module 200, according to embodiments herein.

Figure 10:
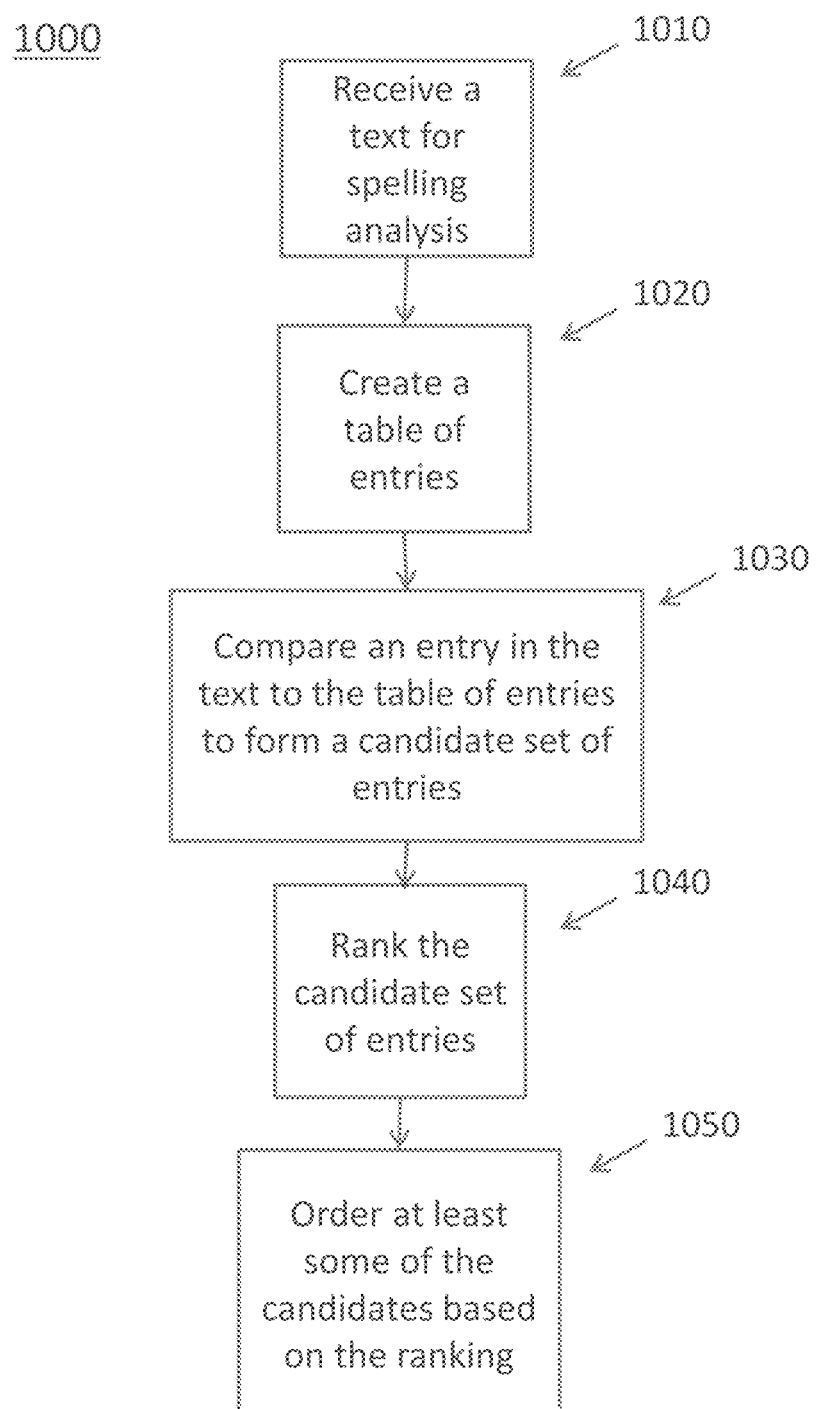
FIG. 10 is a flowchart illustrating a method for adaptive correction of misspelling, according to embodiments herein.

FIG. 10 is a flowchart 1000 illustrating a method for adaptive correction of misspelling utilizing the spellcheck module 200, according to embodiments herein.

At 1010, a text for spelling analysis is received. The text may be a portion of a user-generated search query from a user device 102 sent to the enterprise search engine 110 for generating search results based on the search query.

At 1020, the spellcheck module 200 of the enterprise search engine 110 creates a table of entries of words from a corpus, such as the text collection 230 of the enterprise search engine 110. For each word, the following parameters may be included: a number of occurrences (e.g., a frequency), links to the occurrences, and alternative words having character deletions.

At 1030, the spellcheck module 200 compares an entry in the text, which is part of the user-generated search query, to the table of entries having a pre-defined edit distance (e.g., "med"=2) from the entry and a minimum frequency of occurrence in the corpus (e.g., the text collection 230) to form a candidate set of entries.

At 1040, the spellcheck module 200 ranks the candidate set of entries so that each candidate has a ranking. In an embodiment, context sensitive scoring according to embodiments herein is used for the ranking. In an alternative embodiment, non-contextual scoring according to embodiments herein is utilized for the ranking.

At 1050, the spellcheck module 200 orders at least some of the ranked candidates based on the ranking to identify corrections to the entry.

Figure 11:
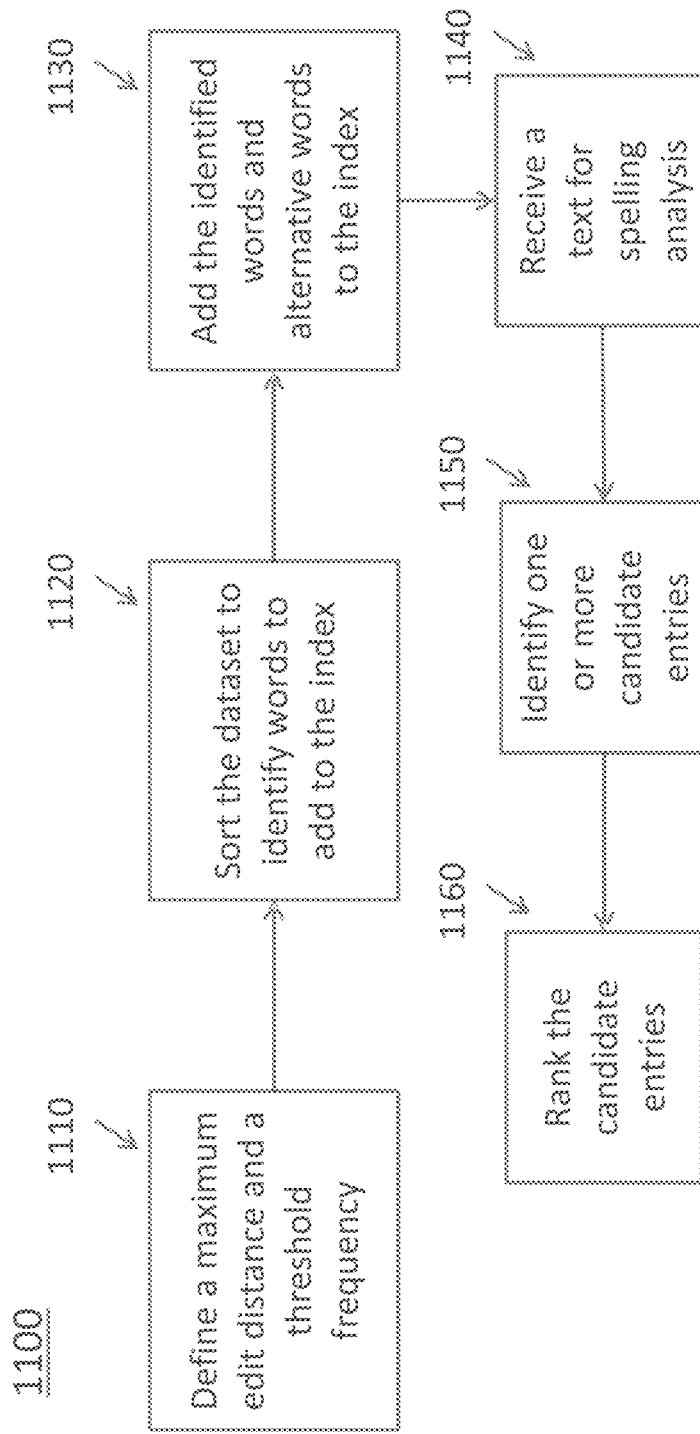
FIG. 11 is a flowchart illustrating a method for adaptive correction of misspelling, according to an additional embodiment.

FIG. 11 is a flowchart 1100 illustrating a method for adaptive correction of misspelling utilizing the spellcheck module 200, according to an additional embodiment.

At 1110, a maximum edit distance and a threshold frequency are defined by the spellcheck module 200. These parameters may be inputted by a user or administrator and may vary based on features of the enterprise search engine 110 or other considerations. The maximum edit distance ("med") and the threshold frequency ("tf") are defined for words of a dataset (i.e., the text collection 230) to be added to an index.

At 1120, the spellcheck module 200 sorts the dataset to identify the words of the dataset to add to the index based on the threshold frequency. At 1130, the identified words and alternative words having character deletions in accordance with the "med" are added to the index to create entries. That is, as soon as a word reaches the "tf," added to the index are all of the deletes of length "med" of the word.

At 1140, a text for spelling analysis is received. The text may be a portion of a user-generated search query from a user device 102 sent to the enterprise search engine 110 for generating search results based on the search query.

At 1150, the spellcheck module 200 identifies one or more candidate entries from the entries of the index by obtaining from the index the entries associated with the text.

At 1160, the spellcheck module 200 ranks the candidate set of entries so that each candidate has a ranking. In an embodiment, non-contextual scoring according to embodiments herein is used for the ranking. In an alternative embodiment, context sensitive scoring according to embodiments herein is utilized for the ranking.

In an embodiment, the enterprise search engine 110 and the spellcheck module 200 may be part of a cognitive system. A cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
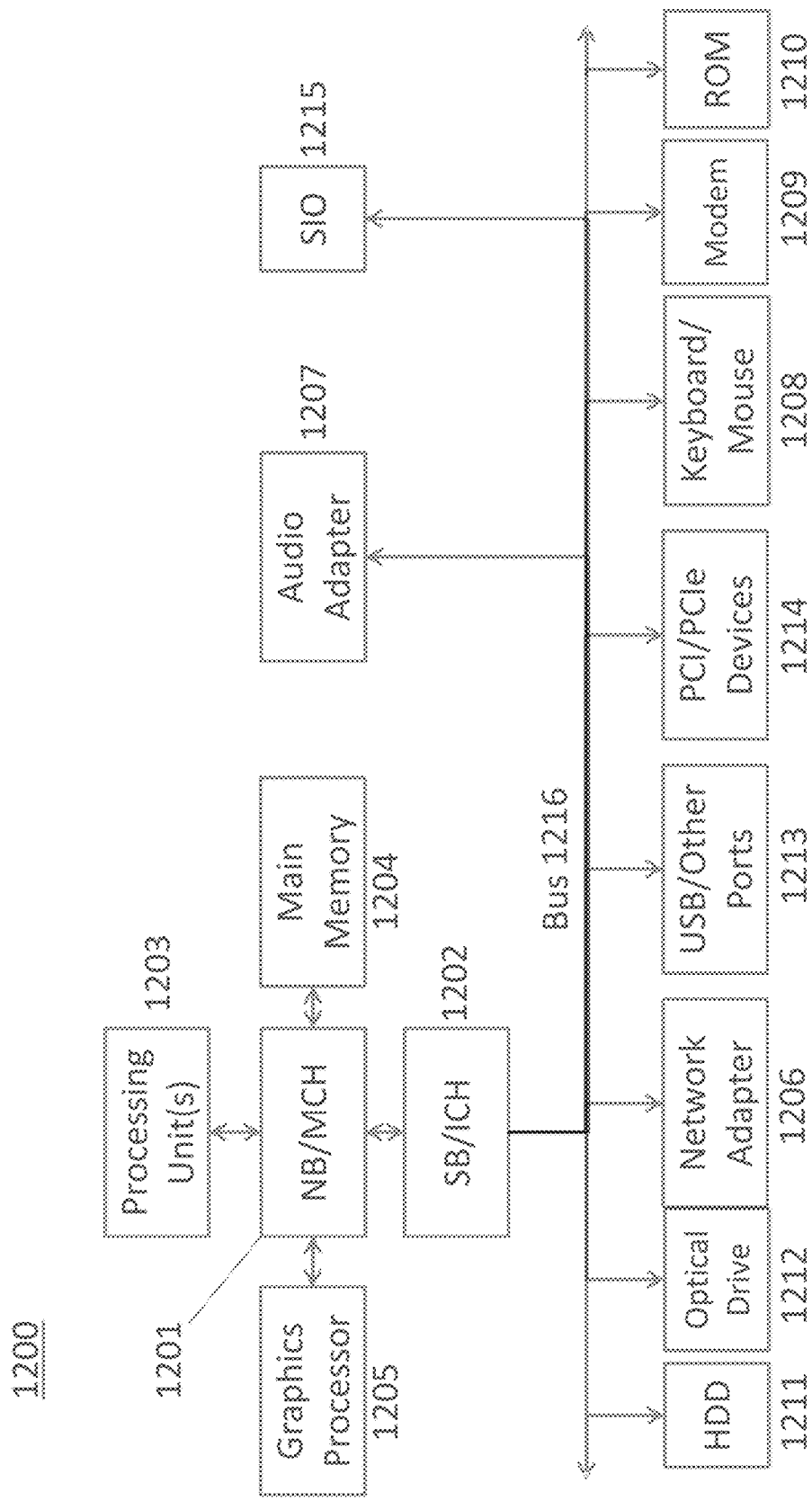
FIG. 12 is a block diagram of an example data processing system in which aspects of the illustrative embodiments may be implemented.

FIG. 12 is a block diagram of an example data processing system 1200 in which aspects of the illustrative embodiments are implemented. Data processing system 1200 is an example of a computer, such as a server or client, in which computer usable code or instructions implementing the process for illustrative embodiments of the present invention are located. In one embodiment, FIG. 12 may represent a server computing device.

In the depicted example, data processing system 1200 can employ a hub architecture including a north bridge and memory controller hub (NB/MCH) 1201 and south bridge and input/output (I/O) controller hub (SB/ICH) 1202. Processing unit 1203, main memory 1204, and graphics processor 1205 can be connected to the NB/MCH 1201. Graphics processor 1205 can be connected to the NB/MCH 1201 through, for example, an accelerated graphics port (AGP).

In the depicted example, a network adapter 1206 connects to the SB/ICH 1202. An audio adapter 1207, keyboard and mouse adapter 1208, modem 1209, read only memory (ROM) 1210, hard disk drive (HDD) 1211, optical drive (e.g., CD or DVD) 1212, universal serial bus (USB) ports and other communication ports 1213, and PCI/PCIe devices 1214 may connect to the SB/ICH 1202 through bus system 1216. PCI/PCIe devices 1214 may include Ethernet adapters, add-in cards, and PC cards for notebook computers. ROM 1210 may be, for example, a flash basic input/output system (BIOS). The HDD 1211 and optical drive 1212 can use an integrated drive electronics (IDE) or serial advanced technology attachment (SATA) interface. A super I/O (SIO) device 1215 can be connected to the SB/ICH 1202.

An operating system can run on processing unit 1203. The operating system can coordinate and provide control of various components within the data processing system 1200. As a client, the operating system can be a commercially available operating system. An object-oriented programming system, such as the Java™ programming system, may run in conjunction with the operating system and provide calls to the operating system from the object-oriented programs or applications executing on the data processing system 1200. As a server, the data processing system 1200 can be an IBM® eServer™ System P® running the Advanced Interactive Executive operating system or the Linux operating system. The data processing system 1200 can be a symmetric multiprocessor (SMP) system that can include a plurality of processors in the processing unit 1203. Alternatively, a single processor system may be employed.

Instructions for the operating system, the object-oriented programming system, and applications or programs are located on storage devices, such as the HDD 1211, and are loaded into the main memory 1204 for execution by the processing unit 1203. The processes for embodiments described herein can be performed by the processing unit 1203 using computer usable program code, which can be located in a memory such as, for example, main memory 1204, ROM 1210, or in one or more peripheral devices.

A bus system 1216 can be comprised of one or more busses. The bus system 1216 can be implemented using any type of communication fabric or architecture that can provide for a transfer of data between different components or devices attached to the fabric or architecture. A communication unit such as the modem 1209 or the network adapter 1206 can include one or more devices that can be used to transmit and receive data.

Those of ordinary skill in the art will appreciate that the hardware depicted in FIG. 12 may vary depending on the implementation. Other internal hardware or peripheral devices, such as flash memory, equivalent non-volatile memory, or optical disk drives may be used in addition to or in place of the hardware depicted. Moreover, the data processing system 1200 can take the form of any of a number of different data processing systems, including but not limited to, client computing devices, server computing devices, tablet computers, laptop computers, telephone or other communication devices, personal digital assistants, and the like. Essentially, data processing system 1200 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for adaptive correction of misspelling, the method comprising:
   defining, by a processor coupled to one or more user devices, a maximum edit distance and a threshold frequency for words of a dataset to be added to an index;
   sorting, by the processor, the dataset to identify the words of the dataset to add to the index based on the threshold frequency;
   adding, by the processor, to the index the identified words and alternative words having character deletions in accordance with the maximum edit distance to create entries;
   receiving, at the processor from a first user device of the one or more user devices, a text for spelling analysis;
   identifying, by the processor, one or more candidate entries from the entries of the index by obtaining from the index the entries associated with the text; and
   ranking, by the processor, the one or more candidate entries based on a ranking score;
   wherein the ranking score is a linear combination of Smoothed Term Probability (STP) and Edit Similarity (ES), and the STP considers a logarithm of a frequency of each candidate entry and a logarithm of all occurrences in the index;
   the linear combination of STP and ES is weighted by a hyper parameter alpha comprising a validation parameter.

2. The method of claim 1, wherein adding to the index the identified words and the alternative words further comprises adding links to the identified words and the alternative words to create the entries.

3. The method of claim 2, further comprising storing in memory associated with the processor an associated link for the alternative words that are not part of the dataset.

4. The method of claim 1, further comprising ordering, by the processor, the one or more candidate entries based on the ranking to identify corrections to the text.

5. The method of claim 1, wherein the processor is part of an enterprise search engine and the dataset comprises a collection of data of the enterprise search engine.

6. A system for adaptive correction of misspelling, the system comprising:
   a processor coupled to one or more user devices to receive user-generated search queries from the one or more user devices, the processor configured to:
   define a maximum edit distance and a threshold frequency for words of a dataset to be added to an index;
   sort the dataset to identify the words of the dataset to add to the index based on the threshold frequency;
   add to the index the identified words and alternative words having character deletions in accordance with the maximum edit distance to create entries;
   receive from a first user device of the one or more user devices a text for spelling analysis;
   identify one or more candidate entries from the entries of the index by obtaining from the index the entries associated with the text; and
   rank the one or more candidate entries based on a ranking score;
   wherein the ranking score is a linear combination of Smoothed Term Probability (STP) and Edit Similarity (ES), and the STP considers a logarithm of a frequency of each candidate entry and a logarithm of all occurrences in the index;
   the linear combination of STP and ES is weighted by a hyper parameter alpha comprising a validation parameter.

7. The system of claim 6, wherein adding to the index the identified words and the alternative words further comprises adding links to the identified words and the alternative words to create the entries.

8. The system of claim 7, wherein the processor is further configured to store in memory associated with the processor an associated link for the alternative words that are not part of the dataset.

9. The system of claim 6, wherein the processor is further configured to order the one or more candidate entries based on the ranking to identify corrections to the text.

10. The system of claim 6, wherein the processor is part of an enterprise search engine and the dataset comprises a collection of data of the enterprise search engine.

11. A computer program product for adaptive correction of misspelling, the computer program product comprising:
    a non-transitory computer readable storage medium having program instructions embodied therewith, the program instructions executable by a processor coupled to one or more user devices to receive user-generated search queries from the one or more user devices to cause the processor to:
    define a maximum edit distance and a threshold frequency for words of a dataset to be added to an index;
    sort the dataset to identify the words of the dataset to add to the index based on the threshold frequency;
    add to the index the identified words and alternative words having character deletions in accordance with the maximum edit distance to create entries;
    receive from a first user device of the one or more user devices a text for spelling analysis;
    identify one or more candidate entries from the entries of the index by obtaining from the index the entries associated with the text; and
    rank the one or more candidate entries based on a ranking score;
    wherein the ranking score is a linear combination of Smoothed Term Probability (STP) and Edit Similarity (ES), and the STP considers a logarithm of a frequency of each candidate entry and a logarithm of all occurrences in the index;
    the linear combination of STP and ES is weighted by a hyper parameter alpha comprising a validation parameter.

12. The computer program product of claim 11, wherein adding to the index the identified words and the alternative words further comprises adding links to the identified words and the alternative words to create the entries.

13. The computer program product of claim 12, wherein the program instructions further cause the processor to store in memory associated with the processor an associated link for the alternative words that are not part of the dataset.

14. The computer program product of claim 11, wherein the program instructions further cause the processor to order the one or more candidate entries based on the ranking to identify corrections to the text.

* * * * *